(12) United States Patent
Mannefred et al.

(10) Patent No.: US 10,852,738 B2
(45) Date of Patent: Dec. 1, 2020

(54) SELF-PROPELLED ROBOTIC TOOL NAVIGATION

(71) Applicant: HUSQVARNA AB, Huskvarna (SE)

(72) Inventors: Björn Mannefred, Jönköping (SE); Stefan Grufman, Bankeryd (SE)

(73) Assignee: HUSQVARNA AB, Huskvarna (SE)

( * ) Notice: Subject to any disclaimer, the term of this patent is extended or adjusted under 35 U.S.C. 154(b) by 170 days.

(21) Appl. No.: 16/069,040

(22) PCT Filed: Jan. 4, 2017

(86) PCT No.: PCT/SE2017/050006
§ 371 (c)(1),
(2) Date: Jul. 10, 2018

(87) PCT Pub. No.: WO2017/123136
PCT Pub. Date: Jul. 20, 2017

(65) Prior Publication Data
US 2019/0025847 A1    Jan. 24, 2019

(30) Foreign Application Priority Data

Jan. 11, 2016   (SE) ...................................... 1650022

(51) Int. Cl.
*G05D 1/02* (2020.01)
*B25J 13/08* (2006.01)
(Continued)

(52) U.S. Cl.
CPC ......... *G05D 1/0225* (2013.01); *A01D 34/008* (2013.01); *A47L 9/2894* (2013.01);
(Continued)

(58) Field of Classification Search
CPC ............. G05D 1/02; B25J 13/08; G06F 19/00
See application file for complete search history.

(56) References Cited

U.S. PATENT DOCUMENTS

| 7,133,746 B2 | 11/2006 | Abramson et al. |
| 7,546,179 B2 * | 6/2009 | Lee ...................... G05D 1/0225 318/568.1 |

(Continued)

FOREIGN PATENT DOCUMENTS

| CA | 2095442 C | 6/1997 |
| EP | 1537439 B1 | 10/2007 |

(Continued)

OTHER PUBLICATIONS

MingRui, Lv et al., "Positioning approach for indoor autonomous mobile robot using a single ultrasonic sensor pair," 2013 IEEE International Conference on Information and Automation (ICIA), IEEE, pp. 787-792. Published Aug. 26, 2013, doi: 10.1109/ICInfA.2013.6720401; pp. 787-788.

(Continued)

*Primary Examiner* — Yuri Kan
(74) *Attorney, Agent, or Firm* — Burr & Forman, LLP

(57) ABSTRACT

A method of navigating a self-propelled robotic tool comprises transmitting a wireless signal (66) along a first signal path between the robotic tool (14) and a first wireless interface of a base station (16) remote from the robotic tool (14); transmitting a wireless signal (66) along a second signal path between the robotic tool (14) and a second wireless interface of the base station (16), said second wireless interface being spatially separated from the first wireless interface by a separation distance; upon receipt, comparing the signal transmitted along the first signal path with the signal transmitted along the second signal path to obtain a propagation time difference between the signal transmitted along the first signal path and the signal transmitted along the second signal path, said propagation time difference defining a path length difference between said first and second signal paths; and calculating, based on the separation distance and the path length difference, a value (Continued)

representative of a bearing (φ) from the base station (16) to the robotic tool (14).

14 Claims, 5 Drawing Sheets

(51) Int. Cl.
    *G06F 19/00*     (2018.01)
    *A01D 34/00*     (2006.01)
    *A47L 9/28*     (2006.01)
    *A01D 101/00*     (2006.01)

(52) U.S. Cl.
    CPC ........... *G05D 1/028* (2013.01); *G05D 1/0219* (2013.01); *A01D 2101/00* (2013.01); *A47L 2201/02* (2013.01); *A47L 2201/04* (2013.01); *G05D 2201/0208* (2013.01); *Y10S 901/01* (2013.01)

(56) References Cited

U.S. PATENT DOCUMENTS

| | | | |
|---|---|---|---|
| 7,990,151 | B2 | 8/2011 | Olsson et al. |
| 7,996,097 | B2 | 8/2011 | DiBernardo et al. |
| 8,027,761 | B1 | 9/2011 | Nelson |
| 8,670,932 | B2 | 3/2014 | Hartman |
| 2004/0210346 | A1 | 10/2004 | Lee et al. |
| 2006/0224309 | A1 | 10/2006 | Schmidt et al. |
| 2007/0050086 | A1 | 3/2007 | Lim et al. |
| 2007/0271011 | A1 | 11/2007 | Lee et al. |
| 2012/0116588 | A1* | 5/2012 | Lee ............ G05D 1/0225 700/259 |
| 2012/0323365 | A1* | 12/2012 | Taylor ............ B25J 19/005 700/259 |
| 2013/0338853 | A1* | 12/2013 | Hsu ............ G05D 1/028 701/2 |
| 2014/0100693 | A1* | 4/2014 | Fong ............ G05D 1/0274 700/253 |
| 2015/0234385 | A1 | 8/2015 | Sandin et al. |
| 2018/0373258 | A1* | 12/2018 | Fici ............ G05D 1/0225 |

FOREIGN PATENT DOCUMENTS

| | | |
|---|---|---|
| KR | 486506 B1 | 4/2005 |
| KR | 782863 B1 | 12/2007 |
| KR | 2008050232 A | 6/2008 |
| WO | 2015072896 A1 | 5/2015 |
| WO | 2016000734 A1 | 1/2016 |

OTHER PUBLICATIONS

International Search Report and Written Opinion for International Application No. PCT/SE2017/050006 dated Apr. 18, 2017.
International Preliminary Report on Patentability for International Application No. PCT/SE2017/050006 dated Jul. 17, 2018.
Dorian Tsai, et al.,"Autonomous Vision-based Tethered-assisted Rover Docking," 2013, http://www.kiss.caltech.edu/study/terrain/papers/autonomous.pdf.
Imperial College, London, "Mobile Robot Navigation," 1997, www.doc.ic.ac.uk/~nd/surprise_97/journal/vol4/jmd/.

* cited by examiner

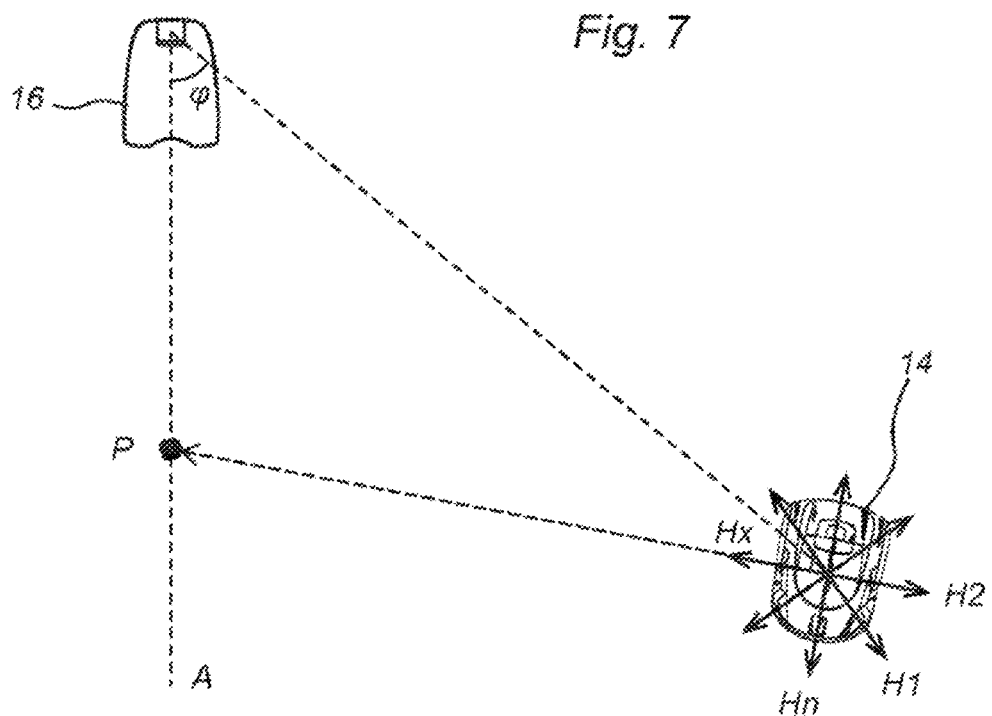

SELF-PROPELLED ROBOTIC TOOL NAVIGATION

FIELD OF THE INVENTION

The present invention relates to an area treatment system comprising a self-propelled robotic tool and a base station. The invention also relates to a method of navigating a self-propelled robotic tool in such a system.

BACKGROUND OF THE INVENTION

Self-propelled robotic tools are widely used for performing maintenance operations within a predetermined work area. By way of example, robotic lawn mowers are used for autonomously cutting lawns within a predetermined work area to be mowed. Boundary wires are generally used to delimit the work area, and the robotic lawn mower is typically arranged to move in a randomly generated irregular pattern to ensure complete coverage of the work area. However, when the work area has an irregular or complex shape, some portions of the work area may be mowed less frequently than others, or not at all. Other exemplary considerations in lawn mower design are cost, complexity, reliability, and ease of use.

US 2015/0234385 A1 discloses a systematic navigation method according to which a lawn mower navigates within boundaries defining an area to be mowed, and uses grass length sensors to follow an edge between cut grass and un-cut grass. There is however a need for a less complicated and more reliable method of navigating.

SUMMARY OF THE INVENTION

It is an object of the present invention to solve, or at least mitigate, parts or all of the above mentioned problems. To this end, there is provided a method of navigating a self-propelled robotic tool, the method comprising transmitting a wireless signal along a first straight signal path between the robotic tool and a first wireless interface of a base station remote from the robotic tool; transmitting a wireless signal along a second straight signal path between the robotic tool and a second wireless interface of the base station, said second wireless interface being spatially separated from the first wireless interface by a separation distance; upon receipt, comparing the signal transmitted along the first signal path with the signal transmitted along the second signal path to obtain a propagation time difference between the signal transmitted along the first signal path and the signal transmitted along the second signal path, said propagation time difference representing a path length difference between said first and second signal paths. Based on the separation distance and the path length difference, a value representative of a bearing from the base station to the robotic tool is calculated. The wireless signal(s) may be transmitted between the robotic tool and the base station in either direction, and preferably in the same direction, i.e. from base station to robotic tool or vice versa. Such a method allows for simple and robust navigation schemes of the robotic tool, and it does not require interaction with any equipment, such as GPS satellites, external to the system defined by the base station and the robotic tool in order for the navigation to function. The self-propelled robotic tool may, by way of example, be a robotic tool adapted for treating an outdoor surface, such as a robotic tool for maintaining gardens or parks. In particular, the self-propelled robotic tool may be a robotic lawn mower. The signal transmitted along the first signal path may be the same as the signal transmitted along the second signal path; alternatively, separate, and possibly different, signals may be transmitted along the two paths.

According to an embodiment, the wireless signal transmitted along the first signal path is transmitted in a direction from the robotic tool to the base station, and the wireless signal transmitted along the second signal path is transmitted in a direction from the robotic tool to the base station. The bearing to the robotic tool may thereby be obtained at the base station. According to an embodiment, the method further comprises wirelessly transmitting, from the base station to the self-propelled robotic tool, information indicative of said propagation time difference and/or path length difference and/or bearing. According to an embodiment, the wireless signal transmitted along the first signal path is identical to the wireless signal transmitted along the second signal path. The wireless signal transmitted along the first signal path may, according to a particularly simple embodiment, be the same signal as the wireless signal transmitted along the second signal path, and it may also be transmitted from the same transmitter on the robotic tool.

According to an embodiment, the propagation time difference is obtained based on a phase difference between the signal transmitted along the first signal path and the signal transmitted along the second signal path.

According to an embodiment, the method comprises obtaining a first time of flight of the signal transmitted along the first signal path. The time of flight represents the distance between the robotic tool and the base station. In combination with the bearing, the position of the robotic tool relative to the base station will be fully determined in a polar coordinate system having the base station at its origin. According to an embodiment, the method comprises obtaining a second time of flight of the signal transmitted along the second signal path, wherein the propagation time difference is obtained based on a difference in time of flight between the signal transmitted along the first signal path and the signal transmitted along the second signal path. Time of flight values, propagation time difference, and/or bearing values may be obtained or calculated at the base station, and communicated to the self-propelled robotic tool. Alternatively, the values may be obtained and calculated directly at the robotic tool.

According to an embodiment, the method comprises moving the robotic tool to a docking start position adjacent to a docking line bearing from the base station; turning the robotic tool in an initial docking heading towards the base station; and moving the robotic tool towards the base station substantially along the docking line bearing. The robotic tool may be moved along the docking line by iteratively moving the robotic tool; obtaining, using the method described above, an updated bearing value from the base station to the robotic tool; and, if the updated bearing value deviates from the docking line bearing by more than a threshold value, adjusting the heading of the robotic tool to return the robotic tool to the docking line bearing. By way of example, the docking line may be followed using a control loop, such as a PID, proportional-integral-derivative, control loop.

Docking to the base station may allow the robotic tool to e.g. charge a battery, and/or synchronize any data with the base station. Docking therefore typically involves bringing a set of electric conductors of the robotic tool in contact with a set of mating conductors of the base station. The ability to follow a docking bearing facilitates and simplifies the design of the electric docking interface, since the robotic tool will connect to the docking interface from a well-defined, predetermined docking bearing. Moreover, the navigation method for following the docking line may be used regardless of the range between the robotic toll and the base station; i.e., the same navigation method may be followed until docking is complete. The robotic tool may navigate to the docking line bearing, and obtain its initial docking heading, by means of any of the navigation methods described hereinbefore, or using any other suitable navigation method.

According to an embodiment, the method further comprises selecting a docking start position at a distance exceeding a pre-configured minimum distance of at least 50 cm, and more preferably, at least 100 cm from the base station. This will allow some distance for the robotic tool to adjust its heading along the docking line, such that any deviation from the docking line when the robotic tool reaches the docking interface will be minimized.

According to another concept, parts or all of the above mentioned problems are solved, or at least mitigated, by a method of navigating a self-propelled robotic tool, the method comprising: at a first position, obtaining a first bearing from the base station to the robotic tool; moving the robotic tool a first distance in a first heading direction to a second position; obtaining, by dead-reckoning at the robotic tool, the distance travelled between said first and second positions; at said second position, obtaining a second bearing from the base station to the robotic tool; turning the robotic tool a turning angle so as to face in a second heading direction transversal to the first heading direction; obtaining, by dead-reckoning at the robotic tool, the turning angle; moving the robotic tool a second distance in said second heading direction to a third position; obtaining, by dead-reckoning at the robotic tool, the distance travelled between said second and third positions; at said third position, obtaining a third bearing from the base station to the robotic tool; and calculating, based on said obtained turning angle, distances, and bearings, at least one of a heading of the robotic tool, a bearing from the robotic tool to the base station, and a range from the robotic tool to the base station. Using this method, the robotic tool may obtain additional positional or navigational information without any direct measurements of e.g. the distance between robotic tool and the base station. The robotic tool may iteratively move a known distance in various directions and obtain the change in bearing from the base station any number of times to increase the positioning accuracy. The robotic tool may measure the distances travelled as well as the turning angle using e.g. an odometer or any type of inertial navigation device.

According to an embodiment, each of said bearings from the base station to the robotic tool is determined following the method disclosed hereinbefore.

According to an embodiment of any of the methods described hereinbefore, the wireless signal is an electromagnetic signal, and preferably an ultra-wideband, UWB, signal as defined by the International Telecommunication Union, or a radio-frequency, RF, signal in the frequency band from about 3 kHz to 300 GHz. Electromagnetic signals are inexpensive and simple to generate, and allow for long transmission ranges. In particular, UWB and RF signals are not prone to be blocked by any minor objects in the signal path. By way of example, a camera or other equipment operating within the optical or visual spectrum may be sensitive to dirt and grass on e.g. any lens or window associated with the equipment. Alternatively, the wireless signal may be an ultrasonic signal, which somewhat relaxes the timing accuracy required for determining the propagation time difference or the time of flight.

According to another aspect, parts or all of the above mentioned problems are solved, or at least mitigated, by an area treatment system comprising a base station and a self-propelled robotic tool, the area treatment system comprising circuitry and/or software configured to navigate the robotic tool according to any of the methods defined hereinbefore. By way of example, the circuitry may comprise one or several processors located within the robotic tool, within the base station, and/or within any other device that may form part of the system. The circuitry and/or software may be distributed between the base station, the robotic tool, and any other device within the system.

According to an embodiment, the base station comprises a pair of wireless beacon navigation interfaces separated by a distance, and the self-propelled robotic tool comprises a wireless beacon navigation interface.

According to an embodiment, the base station comprises a transmitter configured to transmit information indicative of a propagation time difference and/or a bearing to the robotic tool; and the self-propelled robotic tool comprises a receiver configured to receive said information from the base station.

According to an embodiment, the self-propelled robotic tool is a robotic lawn mower.

According to an embodiment, the base station comprises a charger for charging a battery of the robotic tool.

According to still another aspect, parts or all of the above mentioned problems are solved, or at least mitigated, by a computer-readable medium comprising executable code representing instructions to an area treatment system to perform any of the methods defined hereinbefore.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings, where the same reference numerals will be used for similar elements, wherein:

FIG. 7 is a schematic top view of the robotic lawn mower system, illustrating a docking scenario of the robotic lawn mower

DETAILED DESCRIPTION OF THE EXEMPLARY EMBODIMENTS

Figure 1:
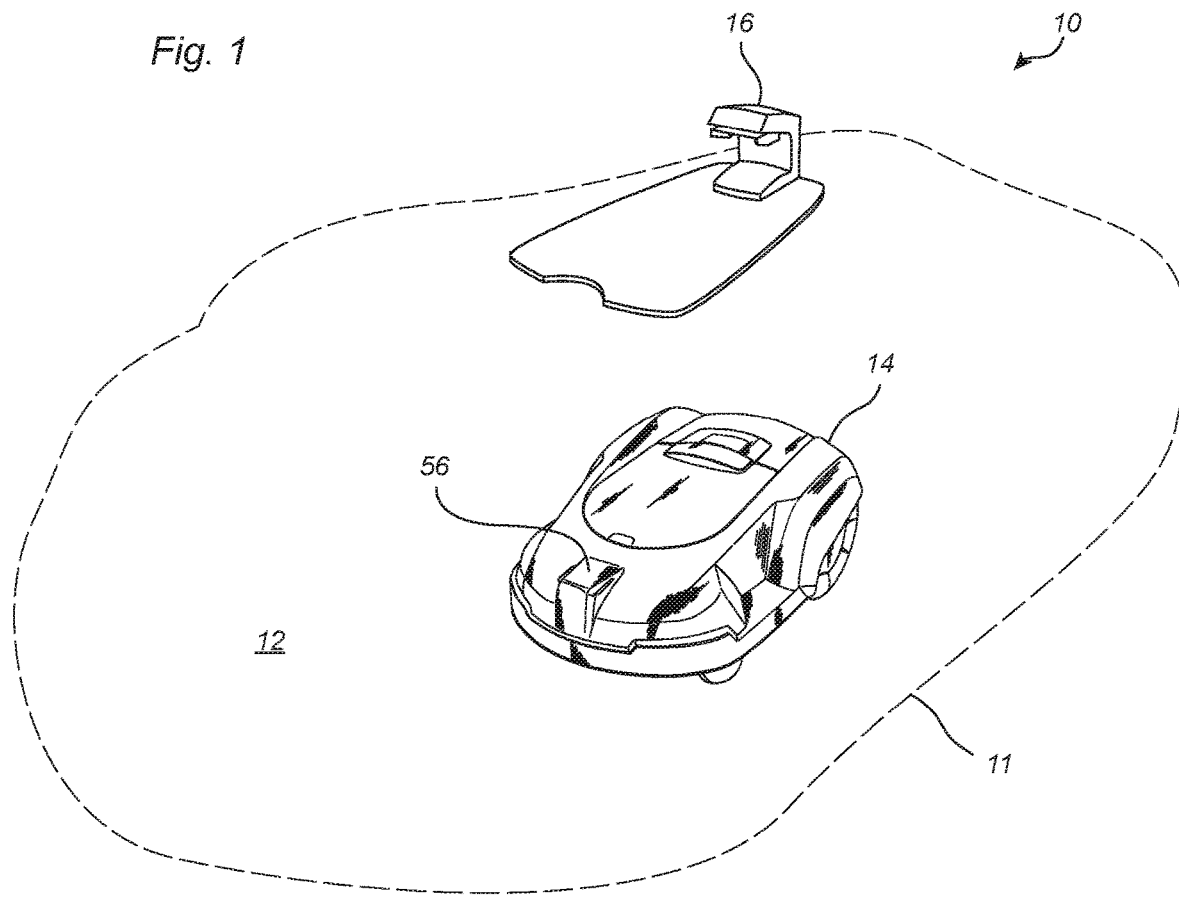
FIG. 1 is a diagrammatic view in perspective of a robotic lawn mower system comprising a base station and a robotic lawn mower.

FIG. 1 schematically illustrates an overview of an area treatment system 10 configured to perform a task within a predefined work area 12 such as a garden, a parcel, a crop field, or a floor area. In the illustrated example, the work area 12 is delimited by a guide wire 11 emitting a magnetic field in the manner known in the art. The area treatment system 10 comprises a self-propelled robotic tool 14 and a base station 16. As primarily described herein, the robotic tool 14 may be a robotic lawn mower. However, the present disclosure may also be useful in connection with robotic tools configured as golf ball collecting tools, vacuum cleaners, floor cleaners, street sweepers, snow removal tools or any other type of robotic tool that is required to operate over a work area in a methodical and systematic or position oriented manner. In particular, the teachings herein may be of particular use in robotic tools configured to execute a task over an area to be treated, wherein a full or at least predetermined coverage of the area to be treated is desired.

Figure 2:
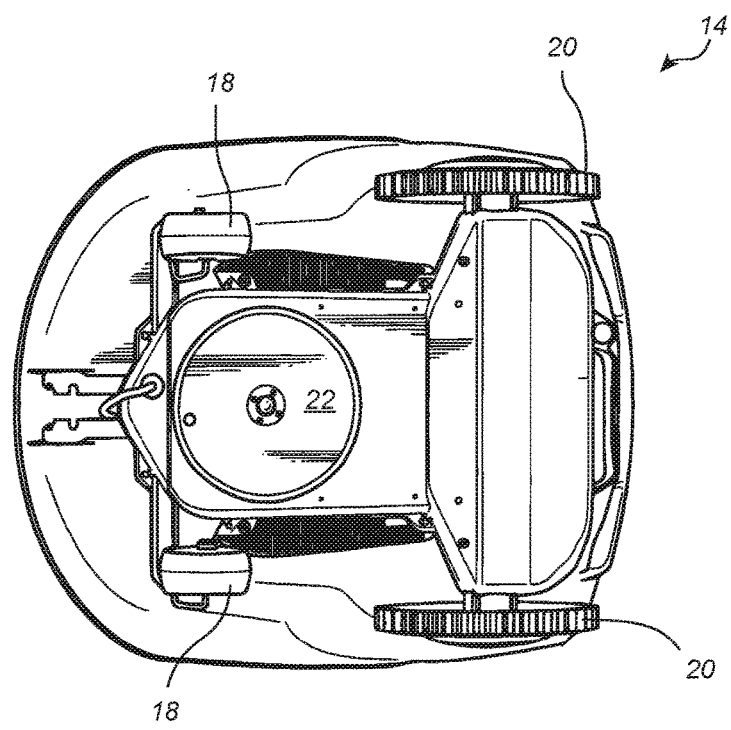
FIG. 2 is a bottom view of the robotic lawn mower of FIG. 1.

FIG. 2 illustrates the self-propelled robotic tool 14 as seen from below. The robotic tool is provided with wheels 18, 20 for moving within the work area 12 to be treated. In the example of FIG. 2, the robotic tool 10 has two front wheels 18, which are of swivel type, and two rear wheels 20. Typically, at least one of the wheels 18, 20 is connected to a motor, such an electric motor, either directly or via a transmission (not illustrated). The robotic tool 14 also comprises at least one tool element configured to perform the task on the area to be treated. The tool element may be a grass cutting device, such as a cutting blade 22, which may be rotatable about a vertical axis.

Figure 3:
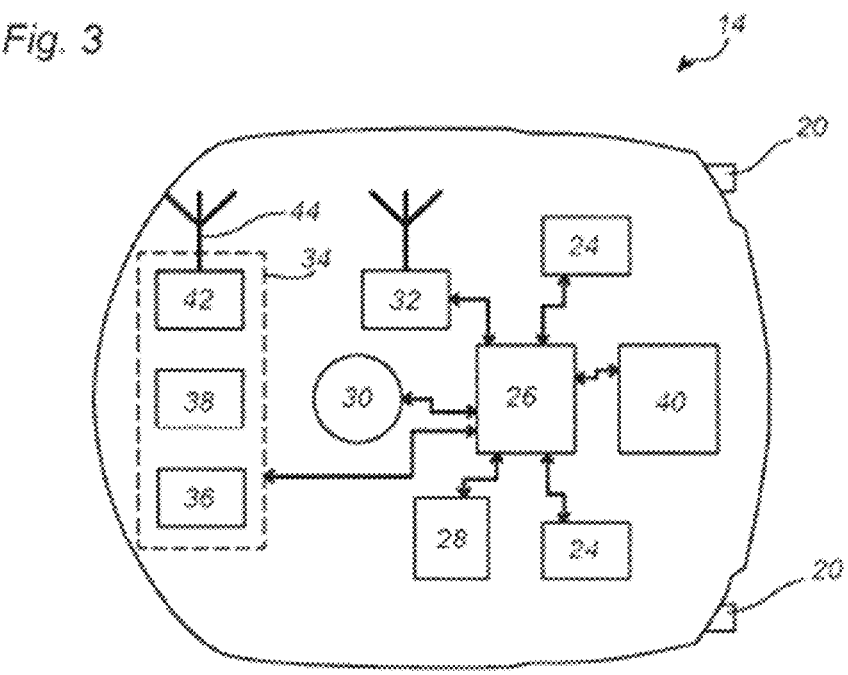
FIG. 3 is a schematic illustration of various functional blocks of the robotic lawn mower of FIGS. 1-2.

FIG. 3 illustrates functional blocks of the robotic tool 14. In the example of FIG. 3, each of the rear wheels 20 is connected to a respective electric propulsion motor 24. This allows for driving the rear wheels 20 independently of one another, enabling e.g. sharp turning of the robotic tool 14. The robotic tool 14 further comprises a controller 26. The controller 26 may be connected to sensors, actuators, and communication interfaces of various kinds, and may be implemented using a central processing unit executing instructions stored on a memory 28. Needless to say, different combinations of general and application-specific integrated circuits may be used as well as different memory technologies. In general, the controller 26 is configured to read instructions from the memory 28 and execute these instructions possibly in view of different sensor signals to control the operation of the robotic tool 14. Typically, the controller 26 is configured to, based on the instructions, control the robotic tool in an autonomous or semi-autonomous manner, i.e. with no, or only occasional, instructions from a human operator. The controller 26 also controls the operation of a cutter motor 30, which is configured to drive the cutting blade 22 (FIG. 2).

A wireless data transceiver 32 is connected to the controller 26, and allows the controller 26 to communicate with the base station 16 or any other device, such as a remote control or a smart phone (not shown).

The robotic tool 14 further comprises a navigation system 34. In the illustrated example, the navigation system 34 comprises an inertial navigation device 36, such as an accelerometer or a gyroscope, and a magnetic field sensor 38 configured to detect a magnetic field emitted by the guide wire 11 (FIG. 1) on/in the ground. A guide wire may be used for defining the boundaries of the area 12 to be treated, or to otherwise provide a reference to assist the robotic tool 14 to navigate. The inertial navigation device 36 allows the robotic tool 14 to keep track of any movement within the area 12 to be treated. The inertial navigation device 36 may be supplemented by a compass (not shown), to provide basic orientation information that may compensate for any drift of the inertial navigation device 36.

The controller 26 also controls the propulsion motors 24, thereby controlling the propulsion of the robotic tool 14 within the area 12 to be treated. The propulsion motors 24 may be stepper motors, allowing the controller 26 to keep track of the respective numbers of turns of the motors 24, and thereby also the distance travelled by the robotic tool 14, as well as any turning angle of the robotic tool 14 when the motors 24 are operated at different speeds or in reverse directions. In this respect, the propulsion motors 24 may operate as odometers. Alternatively, the wheels 20 may be provided with odometer indexers configured to provide feedback to the controller 26 as regards the number of turns of each motor 24. Navigation information from the navigation system 34 and the motors 24 is fused in the controller 26 to provide an accurate position indication.

The controller 26, navigation system 34, transceiver 32, and electric motors 24, 30 are powered by a battery 40. The robotic tool 14 is configured to navigate to the base station 16 on a regular basis, and/or whenever the battery charge is running low, in order to dock with the base station 16 for recharging the battery 40. The base station 16 may be connected so as to receive power from the electric power grid.

The navigation system 34 further comprises a beacon transceiver 42 connected to a beacon antenna 44. The beacon transceiver 42 is configured to regularly transmit an ultra-wideband, UWB, beacon signal to the base station 16.

Figure 4A:
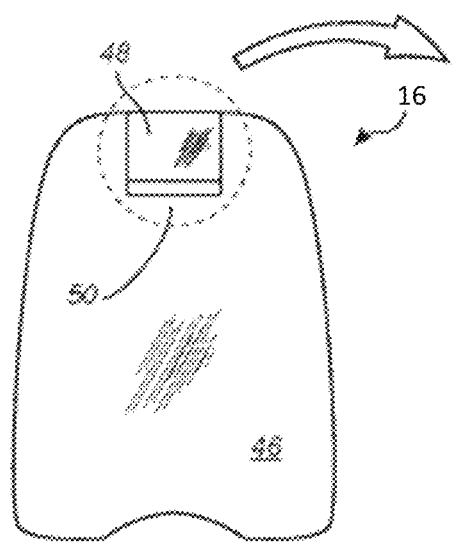
FIG. 4a is a diagrammatic top view of the base station of FIG. 1.

Turning now to FIG. 4a, the base station 16 comprises a parking base plate 46 and an electronics unit 48 provided with a base station docking interface 50. Functional blocks of the electronics unit 48 are illustrated in greater detail in the magnified view of FIG. 4b. The base station docking interface 50 comprises a charger 51 for charging the battery 40 of the robotic tool 14. The charger 51 is provided with a pair of charging connectors 52a-b facing each other. The charging connectors 52a-b are resiliently suspended to allow being pressed apart against a bias, which is schematically illustrated by a pair of springs 54a-b. A mating robotic tool docking interface 56 is provided with a pair of charging connectors 58a-b facing away from each other. The robotic tool docking interface 56 is configured to enter the base station docking interface 50, electrically connecting each charging connector 58a-b of the robotic tool 14 with a respective charging connector 52a-b of the base station 16, as the robotic tool 14 moves into its docking position along a docking line A in the direction illustrated by an arrow. Needless to say, the configuration of the docking interfaces 50, 56 is merely an example; docking interfaces may be designed in many different ways.

A pair of base station beacon transceivers 60a-b are configured to receive the UWB beacon from the beacon transceiver 42 of the robotic tool 14. The beacon transceivers 60a-b are provided with respective antennas 61a-b separated by a distance D, and are connected to a processor 62 comprising a timer. The processor 62 is configured to receive the beacon signal from each of the beacon transceivers 60a-b, and calculate the difference in arrival time between the received beacon signals. Based on the arrival time difference and the separation distance D, the processor 62 will calculate the bearing from the base station 16 to the robotic tool 14 in a manner described more in detail further below. A wireless data transceiver 64 allows the base station 16 to transmit the calculated bearing to the robotic tool 14.

Figure 5A:
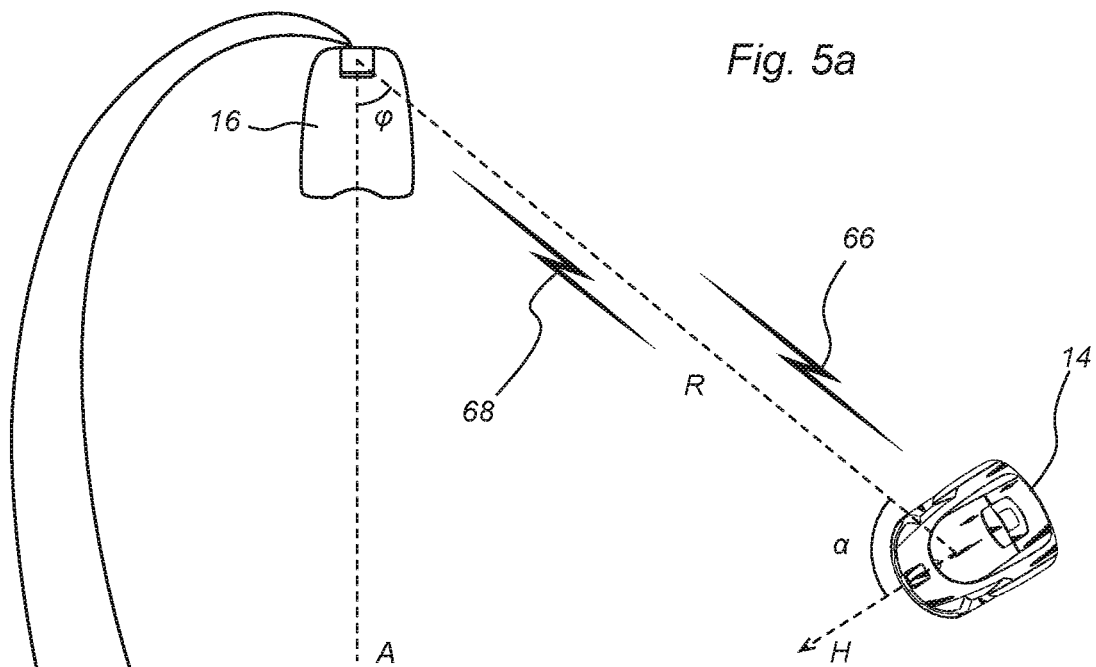
FIG. 5a is a schematic top view illustrating a navigation scenario of the robotic lawn mower.
Figure 5B:
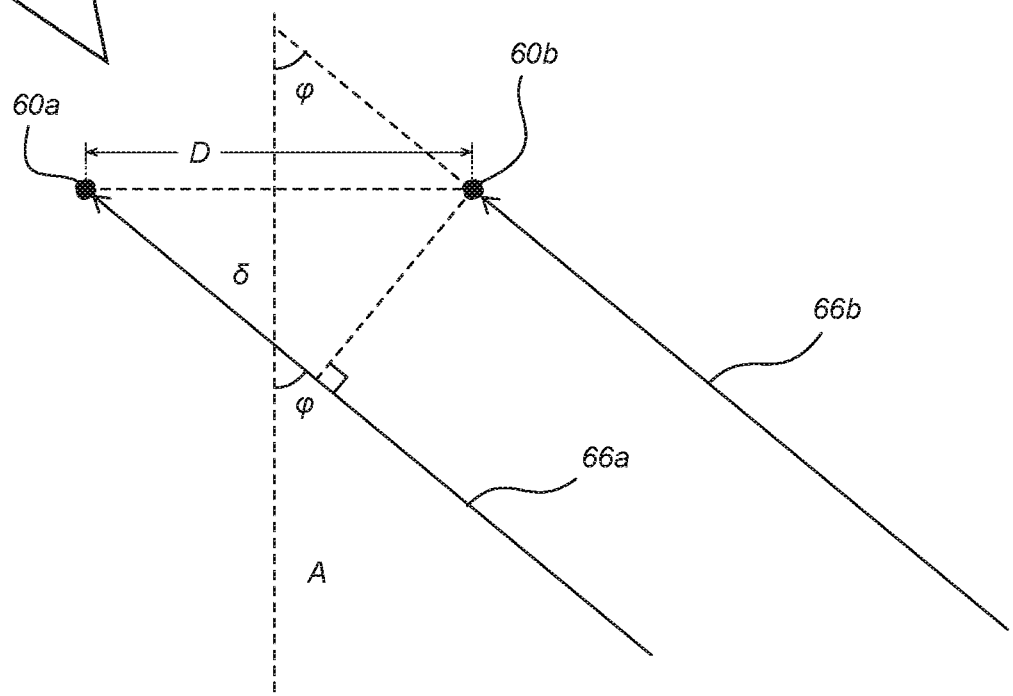
FIG. 5b is a schematic, magnified illustration of a pair of wireless transceivers at the base station, and a signal received along two separate signal paths from the robotic lawn mower.

FIGS. 5*a-b* illustrate a two-way positioning scenario, i.e. positioning making use of two-way transmissions between the base station 16 and the robotic tool 14. The positioning is performed using a local beacon(s), i.e. beacon(s) remote from the robotic tool 14 but still within, or adjacent to, the work area 12 (FIG. 1). The robotic tool 14 is located at a range R and a bearing φ from the base station 16, both of which are initially unknown to the base station 16 and the robotic tool 14. Moreover, the robotic tool 14 is oriented so as to move in a heading H. A bearing from the robotic tool 14 to the base station 16 is represented by an angle α. In the illustrated example, the bearing φ from the base station 16 to the robotic tool 14 is measured relative to the docking line A, whereas the bearing α from the robotic tool 14 to the base station 16 is measured relative to the heading H of the robotic tool 14. The robotic tool 14 transmits a beacon signal 66 to the base station 16, and starts a timer. Upon receipt of the beacon signal 66, the base station immediately returns a UWB beacon response signal 68, via the UWB transceivers 60*a-b*, to the robotic tool 14, which stops the timer. The robotic tool 14 then calculates, based on the measured round-trip time and a known signal processing delay at the base station 16, the one-way time-of-flight, which together with the speed of light, c, determines the range R between the robotic tool 14 and the base station 16.

The detail view of FIG. 5*b* schematically illustrates an example of how the bearing φ can be determined. The UWB beacon signal 66 travels from the robotic tool 14 to the first transceiver 60*a* along a first signal path 66*a*, and to the second transceiver 60*b* along a second signal path 66*b*. At a range R»D, the incident UWB beacon signal 66*a-b* at each base station beacon transceiver 62*a-b* forms the angle φ to a line parallel to the docking line A. A path length difference δ from the robotic tool beacon transceiver 42 to the respective base station beacon transceivers 60*a-b* results in a propagation time difference t, i.e. δ=ct. The bearing φ may be calculated using $$\sin(\varphi) = \frac{\delta}{D}$$

The calculated bearing φ is communicated from the base station 16 to the robotic tool 14 via their respective wireless data transceivers 64, 32. Similarly, the robotic tool 14 may communicate its obtained range value R to the base station 16, to ensure that the base station 16 and the robotic tool 14 share the same navigation information. For the sake of completeness it should be added that for most practical applications, an approximate value of R is sufficient; hence, it does not matter whether the UWB beacon response signal 68 is transmitted from the first beacon transceiver 60*a*, the second beacon transceiver 60*b*, or both. In fact, a response signal may be transmitted from any other wireless interface instead, such as the wireless data transceiver 64.

Figure 6:
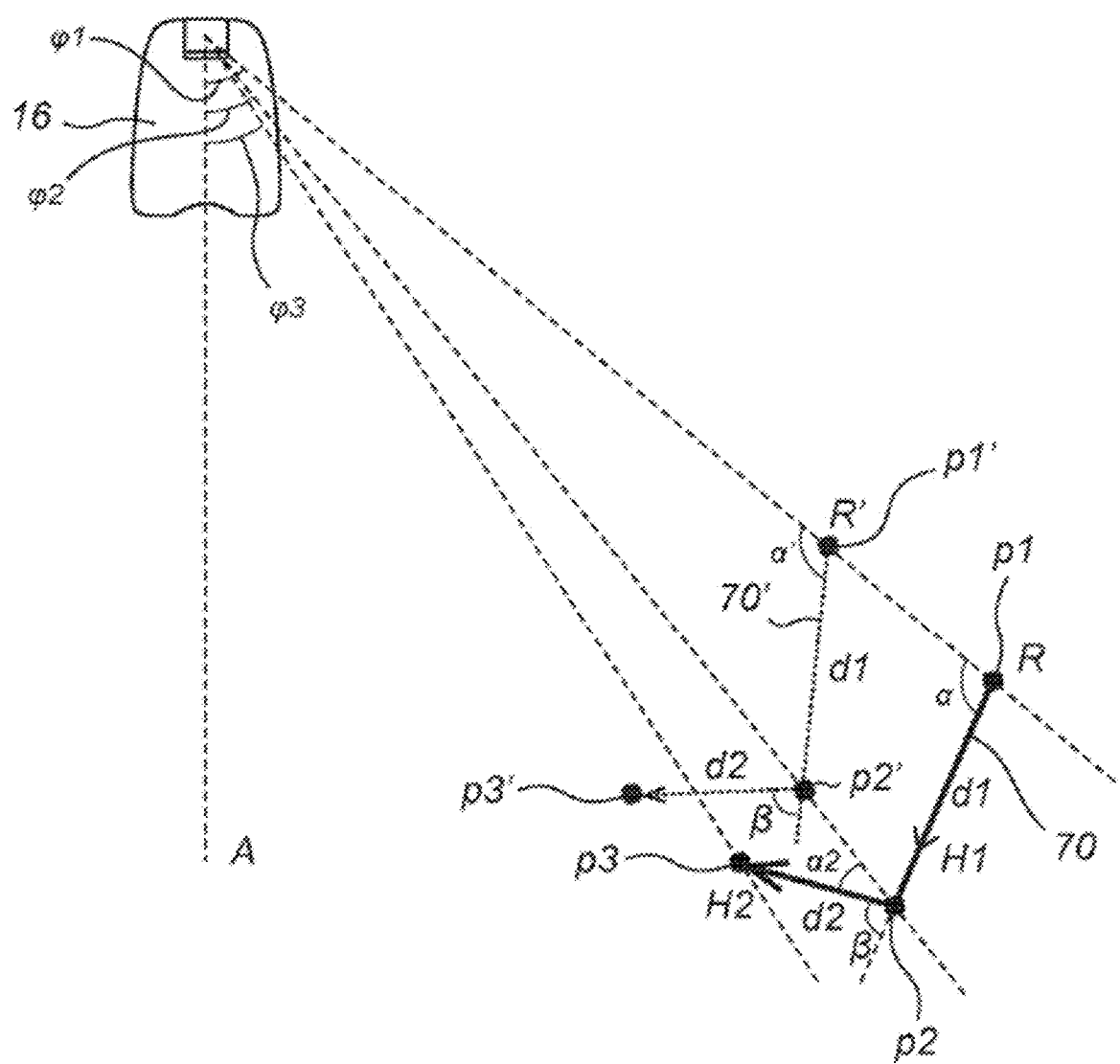
FIG. 6 is a schematic top view of the robotic lawn mower system, illustrating a second navigation scenario of the robotic lawn mower.

FIG. 6 illustrates an alternative method of determining the range R. For clarity of illustration, the robotic tool 14 as such is not illustrated; it is instead represented by its positions and headings. The method allows determining the heading H (FIG. 5), or the bearing α from the robotic tool 14 to the base station, as well as the range R, based on only the bearing φ from the base station 16 to the robotic tool 14 and dead reckoning at the robotic tool 14

The robotic tool 14 starts at a first position p1, at an unknown range R from the base station 16. At position p1, the robotic tool has an unknown heading H1 and an unknown bearing α1 from the robotic tool 14 to the base station 16, whereas the bearing φ1 from the base station 16 to the robotic tool 14 is known. The bearing φ1 may, by way of example, be determined following any of the methods described hereinbefore.

Thereafter, the robotic tool 14 drives a first distance d1, determined by dead reckoning, to a second position p2. At position p2 the robotic tool 14 obtains its new bearing φ2, e.g. following any of the methods described hereinbefore, and changes its heading by a known turning angle β to a new, unknown heading H2. The new heading H2 should be transversal to the previous heading H1, and preferably has a large orthogonal component to the previous heading H1. The turning angle β may be determined by dear reckoning, e.g. using odometers tracking the motion of the rear wheels 20, or using the compass.

From the position p2 the robotic tool 14 drives a second distance d2, again determined by dead reckoning, to a third position p3. At position p3, the robotic tool 14 again obtains its new bearing, φ3, e.g. following any of the methods described hereinbefore. The total path 70 traversed from position p1 is represented by the paths d1, d2, forming the angle β with each other. As is illustrated in FIG. 6, the traversed path can be mapped onto the determined bearings φ1, φ2, φ3 for only one pair of a, R. Trying to map the path 70', which is identical to the path 70 but starts from the wrong range R', allows mapping only two of the three positions p1-p3 to their respective determined bearings φ1, φ2, φ3, at best. In other words, using the iterative navigation method described with reference to FIG. 6, the bearing α to the base station and the range R can be unambiguously determined. The bearings α, φ together unambiguously determine the heading H relative to any reference line, such as the docking line A.

It will be understood that the method is not limited to two paths d1, d2 and three bearing measurements φ1, φ2, φ3. The bearing φ may be measured at an indefinite number of points p1, p2 . . . pn, each consecutive pair of points being separated by a path d1, d2 . . . d(n−1) determined by dead reckoning, each consecutive pair of paths d1, d2 . . . d(n−1) forming a heading change angle β . . . β(n−2), determined by dead reckoning, between them. The length of each path d1, d2 . . . d(n−1) may be allowed to approach zero, as may the heading change angle β1 . . . β(n−2), increasing the number of acquired data points. Thereby, a best estimate of the bearing α and the range R from the robotic tool 14 to the base station 16 may be continuously updated.

FIG. 7 illustrates a docking method allowing the robotic tool 14 to dock to the base station 16. First, the robotic tool 14 navigates to a docking start position P on the docking line A. It is preferable that the docking start position be at a distance exceeding a minimum distance of at least 50 cm from the base station 16, to allow some distance for the robotic tool 14 to subsequently correct any deviations in its heading as it moves towards the base station 16. The robotic tool 14 may navigate to the point P using any of the navigation methods described hereinbefore. FIG. 7 illustrates an alternative method of navigating to a point P on the docking line A, which allows the docking line A to be reached based only on measurements of the bearing cp. First, the robotic tool 14 tries moving in a plurality of different directions, represented by headings H1, H2 . . . Hx . . . Hn in FIG. 7. For each movement, the robotic tool detects a change in the bearing φ from the base station 16 to the robotic tool 14. Based on each respective detected change in the bearing φ, the robotic tool 14 selects the heading Hx which represents the greatest decrease in the bearing φ, and moves along the selected heading Hx until it reaches a point P on the docking line bearing A. After having reached the docking line, the robotic tool turns to an initial docking heading towards the base station 16. The robotic tool 14 may find an approximate bearing to the base station 16 using any of the navigation methods described hereinbefore, or using any other suitable method. Thereafter, the robotic tool 14 moves towards the base station 16 substantially along the docking line bearing A, while iteratively obtaining an updated bearing φ from the base station 16 to the robotic tool 14 and, if the updated bearing φ deviates from the docking line bearing A by more than a threshold value, adjusting the heading of the robotic tool 14 to return the robotic tool 14 to the docking line bearing A. The updated bearing φ may be obtained based on a beacon propagation time difference between the beacon transceiver 42 of the robotic tool 14 and the respective beacon transceivers 60*a-b* of the base station 16. As the robotic tool 14 approaches the base station 16, the condition R»D will no longer be true. Thereby, the bearing φ to the robotic tool 14 will no longer be approximately the same for the respective base station beacon transceivers 62*a-b* when the robotic tool 14 is very close to the base station 16. Needless to say, however, this is not necessary. Navigating the robotic tool 14 so as to keep the propagation time difference to a minimum assures that the robotic tool 14 follow the docking line A, regardless of its range R from the base station 16. As the robotic tool 14 approaches the base station 16, its speed along the docking line A may be gradually or step-wise reduced to permit a more accurate following of the docking line A, the shorter the distance between the robotic tool 14 and the base station 16 becomes. This may increase the precision of the docking.

Figure 4B:
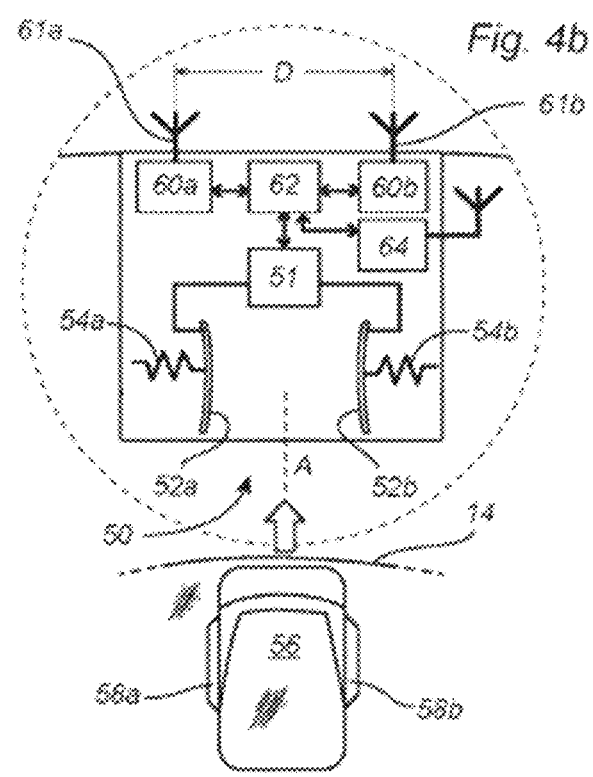
FIG. 4b is a magnified view of a portion of the base station of FIG. 4a, schematically illustrating various functional blocks thereof, together with a docking interface portion of the robotic lawn mower of FIGS. 1-3.

In the specific exemplary base station beacon geometry of FIGS. 4*b* and 5*b*, the base station beacon transceivers 60*a-b* are located along a line perpendicular to the docking line A, and on equal distance from the docking line A on either sides thereof. Using this geometry, the navigation along the docking line A becomes particularly simple; the robotic tool 14 strives to navigate so as to keep the propagation time difference between the signal paths 66*a*, 66*b* (FIG. 5*b*) to a minimum. Using other base station beacon geometries, the robotic tool 14 may navigate with the aim to make the propagation time difference meet some other condition.

The first and second beacon transceivers 60*a-b* of the base station may be integrated on the same circuit board, in the same module, or even on the same chip, thereby providing for a very accurate knowledge of the separation distance D, as well as the amount of any electronics delay in the determination of the difference in arrival time to the base station 16. Also the processor 62 may be integrated on the same circuit board or chip as the beacon transceivers 60*a-b*.

According to the embodiments described above, a timer is used for obtaining an UWB signal propagation time difference between the beacon transceiver 42 of the robotic tool 14 and the respective beacon transceivers 60*a-b* of the base station 16. Alternatively, the path length difference may be obtained by detecting a phase difference between RF (radio frequency) signals received at the respective base station beacon transceivers 60*a-b*. The phase difference may be detected either as the difference in phase of a modulation superimposed on a carrier signal, or as the difference in phase of a carrier signal as such. In order to maximize the simplicity and resilience of such an embodiment, it is preferable that the geometry and wireless frequency of the beacon transceivers 42, 60*a-b* be selected such that the receiving beacon transceiver will typically be in the electromagnetic far-field range of the transmitting beacon transceiver. Depending on the separation distance D and the beacon signal frequency, the use of phase may give ambiguous bearing values. Such an ambiguity may be resolved e.g. by keeping continuous track of the phase difference. The separation distance D may also be selected based on the beacon frequency in order to keep any unambiguity to a minimum. Alternatively, such an ambiguity may be resolved by measuring the phase difference between beacon signals transmitted at two or more different frequencies. Detecting phase difference at multiple frequencies may also be used for determining an absolute range R between the base station 16 and the robotic tool 14.

The exemplary methods disclosed hereinbefore are directed to real-time navigation, according to which the obtained positions of the robotic tool are used for direct control of the robotic tool. Detected beacon patterns may also be recorded at different positions across the work area, in order to generate a beacon signal map associated with positions or paths, such as a docking path.

The present disclosure relates to a plurality of inventive concepts, which may be implemented separately or in combination, and each of which may be the subject of one or several divisional applications. The inventions have mainly been described above with reference to a few embodiments. However, as is readily appreciated by a person skilled in the art, other embodiments than the ones disclosed above are equally possible within the scope of the invention, as defined by the appended patent claims. For example, in the illustrated examples, the base station beacon transceivers 60*a-b* are co-located with a charger 51 and a docking interface 50. This is not necessary; the beacons 60*a-b* may be arranged in a separate, stand-alone unit. For ease of installation of the system it may be preferable, but not necessary, that the beacons 60*a-b* be rigidly connected to each other within a single, integrated device, in order to have an a priori accurate knowledge of the separation distance D.

In the illustrated examples, the bearing φ is determined by transmitting a beacon signal 66 from a single beacon transceiver 42 of the robotic tool 14 to a pair of beacon transceivers 60*a-b* of the base station. The bearing can also be determined by transmitting a beacon signal from each of the beacon transceivers 60*a-b* of the base station 16 to the beacon transceiver 42 of the robotic tool 14, wherein the robotic tool 14 obtains the propagation time difference by comparing the arrival times of the signals from the respective base station beacon transceivers 60*a-b*. The propagation time difference may also be obtained by transmitting a first beacon signal from the robotic tool beacon transceiver 42 to the first base station beacon 60*a*, and second, different beacon signal from the second base station transceiver 60*b* to the robotic tool beacon transceiver 42. Exact arrival times may be compared, and the propagation time difference may be obtained, e.g. using synchronized clocks at the base station 16 and the robotic tool 14.

For reasons of clarity of illustration, the two base station beacon transceivers 60*a-b* have been described as being located in the same horizontal plane. Alternatively, they may be vertically separated. A third base station beacon transceiver vertically separated from the base station beacon transceivers 60*a-b* may add the possibility of obtaining an elevation angle to the robotic tool, which may facilitate navigating e.g. a hilly garden involving substantial differences in altitude.

Even though each of the beacon transceivers 42, 60a-b has been described as a bidirectional transceiver, they may alternatively be configured as either transmitters or receivers, such that one of the robotic tool beacon transceiver and the base station beacon transceiver pair is adapted for transmission only, and the other is adapted for reception only.

The invention claimed is:

1. A method of navigating a robotic tool that is self-propelled, the method comprising:
   transmitting a wireless signal along a first signal path between the robotic tool and a first wireless interface of a base station remote from the robotic tool;
   transmitting a wireless signal along a second signal path between the robotic tool and a second wireless interface of the base station, said second wireless interface being spatially separated from the first wireless interface by a separation distance;
   upon receipt, comparing the signal transmitted along the first signal path with the signal transmitted along the second signal path to obtain a propagation time difference between the signal transmitted along the first signal path and the signal transmitted along the second signal path, said propagation time difference defining a path length difference between said first and second signal paths;
   calculating, based on the separation distance and the path length difference, a value representative of a first bearing from the base station to the robotic tool at a first position;
   moving the robotic tool a first distance in a first heading direction to a second position;
   obtaining, by dead-reckoning at the robotic tool, the distance travelled between said first and second positions;
   at said second position, obtaining a second bearing from the base station to the robotic tool;
   turning the robotic tool a turning angle so as to face in a second heading direction transversal to the first heading direction;
   obtaining, by dead-reckoning at the robotic tool, the turning angle;
   moving the robotic tool a second distance in said second heading direction to a third position;
   obtaining, by dead-reckoning at the robotic tool, the distance travelled between said second and third positions;
   at said third position, obtaining a third bearing from the base station to the robotic tool;
   calculating, based on said obtained turning angle, distances, and first, second and third bearings, at least one of a heading of the robotic tool, a bearing from the robotic tool to the base station, and a range from the robotic tool to the base station; and
   moving the robotic tool towards the base station in accordance with the at least one of the heading of the robotic tool, the bearing from the robotic tool to the base station, and the range from the robotic tool to the base station.

2. The method according to claim 1, wherein the wireless signal transmitted along the first signal path is transmitted in a first direction from the robotic tool to the base station, and the wireless signal transmitted along the second signal path is transmitted in a second direction from the robotic tool to the base station, the first direction and the second direction being different; and wherein the method further comprises wirelessly transmitting, from the base station to the robotic tool, information indicative of said propagation time difference and/or path length difference and/or bearing.

3. The method according to claim 1, wherein the propagation time difference is obtained based on a phase difference between the signal transmitted along the first signal path and the signal transmitted along the second signal path.

4. The method according to claim 1, comprising obtaining a first time of flight of the signal transmitted along the first signal path.

5. The method according to claim 1, further comprising selecting a docking start position at a distance exceeding a pre-configured minimum distance of at least 50 cm from the base station.

6. A method of navigating a robotic tool that is self-propelled, the method comprising:
   at a first position, obtaining a first bearing from a base station to the robotic tool;
   moving the robotic tool a first distance in a first heading direction to a second position;
   obtaining, by dead-reckoning at the robotic tool, the distance travelled between said first and second positions;
   at said second position, obtaining a second bearing from the base station to the robotic tool;
   turning the robotic tool a turning angle so as to face in a second heading direction transversal to the first heading direction;
   obtaining, by dead-reckoning at the robotic tool, the turning angle;
   moving the robotic tool a second distance in said second heading direction to a third position;
   obtaining, by dead-reckoning at the robotic tool, the distance travelled between said second and third positions;
   at said third position, obtaining a third bearing from the base station to the robotic tool;
   calculating, based on said obtained turning angle, distances, and first, second and third bearings, at least one of a heading of the robotic tool, a bearing from the robotic tool to the base station, and a range from the robotic tool to the base station; and
   moving the robotic tool towards the base station in accordance with the at least one of the heading of the robotic tool, the bearing from the robotic tool to the base station, and the range from the robotic tool to the base station.

7. The method according to claim 6, wherein each of said first, second and third bearings from the base station to the robotic tool is determined by:
   transmitting a first wireless signal along a first signal path between the robotic tool and a first wireless interface of the base station;
   transmitting a second wireless signal along a second signal path between the robotic tool and a second wireless interface of the base station, said second wireless interface being spatially separated from the first wireless interface by a separation distance;
   upon receipt, comparing the first wireless signal transmitted along the first signal path with the second wireless signal transmitted along the second signal path to obtain a propagation time difference between the first signal transmitted along the first signal path and the second signal transmitted along the second signal path, said propagation time difference defining a path length difference between said first and second signal paths; and calculating, based on the separation distance and the path length difference, a value representative of a corresponding one of the first, second or third bearing from the base station to the robotic tool.

8. The method according to claim 7, wherein the first wireless signal and the second wireless signal are ultra-wideband electromagnetic signals or radio-frequency electromagnetic signals.

9. An area treatment system comprising:
a base station;
a robotic tool that is self-propelled; and
circuitry configured to navigate the robotic tool, wherein being configured to navigate the robotic tool comprises being configured to:
obtain, at a first position, a first bearing from the base station to the robotic tool;
move the robotic tool a first distance in a first heading direction to a second position;
obtain, by dead-reckoning at the robotic tool, the distance travelled between said first and second positions;
obtain, at said second position, a second bearing from the base station to the robotic tool;
turn the robotic tool a turning angle so as to face in a second heading direction transversal to the first heading direction;
obtain, by dead-reckoning at the robotic tool, the turning angle;
move the robotic tool a second distance in said second heading direction to a third position;
obtain, by dead-reckoning at the robotic tool, the distance travelled between said second and third positions;
obtain, at said third position, a third bearing from the base station to the robotic tool;
calculate, based on said obtained turning angle, distances, and first, second and third bearings, at least one of a heading of the robotic tool, a bearing from the robotic tool to the base station, and a range from the robotic tool to the base station; and
move the robotic tool towards the base station in accordance with the at least one of the heading of the robotic tool, the bearing from the robotic tool to the base station, and the range from the robotic tool to the base station.

10. The area treatment system according to claim 9, wherein the base station comprises a pair of wireless beacon navigation interfaces separated by a distance;
and the robotic tool comprises a wireless beacon navigation interface.

11. The area treatment system according to claim 10, wherein the base station comprises a transmitter configured to transmit information indicative of any of a propagation time difference, a propagation path length difference, and a bearing to the robotic tool; and the robotic tool comprises a receiver configured to receive said information from the base station.

12. The area treatment system according to claim 9, wherein the robotic tool is a robotic lawn mower.

13. The area treatment system according to claim 9, wherein the base station comprises a charger for charging a battery of the robotic tool.

14. A non-transitory computer-readable medium comprising:
executable code representing instructions to an area treatment system to perform the method according to claim 6.

* * * * *